United States Patent
Chitrapura et al.

(10) Patent No.: US 7,865,354 B2
(45) Date of Patent: Jan. 4, 2011

(54) EXTRACTING AND GROUPING OPINIONS FROM TEXT DOCUMENTS

(75) Inventors: Krishna Prasad Chitrapura, New Delhi (IN); Sumit Negi, New Delhi (IN); Shourya Roy, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 1022 days.

(21) Appl. No.: 10/729,165

(22) Filed: Dec. 5, 2003

(65) Prior Publication Data

US 2005/0125216 A1    Jun. 9, 2005

(51) Int. Cl.
    *G06F 17/28* (2006.01)
(52) U.S. Cl. .................................... 704/4; 704/7; 704/9
(58) Field of Classification Search .............. 704/1–10, 704/251, 257, 277, 255, 270; 707/5, 6, 100; 434/178
    See application file for complete search history.

(56) References Cited

U.S. PATENT DOCUMENTS

| | | | |
|---|---|---|---|
| 6,289,304 B1* | 9/2001 | Grefenstette | 704/9 |
| 6,332,143 B1* | 12/2001 | Chase | 707/100 |
| 6,418,435 B1* | 7/2002 | Chase | 707/5 |
| 6,721,734 B1* | 4/2004 | Subasic et al. | 707/5 |
| 6,859,771 B2* | 2/2005 | Huang et al. | 704/1 |
| 6,910,004 B2* | 6/2005 | Tarbouriech et al. | 704/9 |
| 7,027,974 B1* | 4/2006 | Busch et al. | 704/4 |
| 7,234,942 B2* | 6/2007 | Hu et al. | 434/178 |
| 2004/0128122 A1* | 7/2004 | Privault et al. | 704/4 |

FOREIGN PATENT DOCUMENTS

| | | |
|---|---|---|
| JP | 2002-117027 | 4/2002 |
| JP | 2002-304401 | 10/2002 |
| JP | 2003-248687 | 9/2003 |
| JP | 2003-271616 | 9/2003 |

OTHER PUBLICATIONS

Turney, P. D. and Littman M. L., "Unsupervised Learning of Semantic Orientation from a Hundred-Billion-Word Corpus", *Technical Report NRC Technical Report ERB-1094*, Institute for Information Technology, National Research Council Canada, May 2002.

Hatzivassiloglou, V. and McKeown, K. R., "Predicting the semantic orientation of adjectives", *Proceedings of 35th Annual Meeting of the Association for Computational Linguistics (ACL-EACL 97)*, pp. 174-181.

(Continued)

*Primary Examiner*—Huyen X. Vo
(74) *Attorney, Agent, or Firm*—Gibb I.P. Law Firm, LLC

(57) ABSTRACT

Opinions about a topic are extracted from a corpus of text documents. Opinions are extracted based on rules defining regular expressions for parts-of-speech tags. Opinions are grouped based on their semantic orientation as favorable, unfavorable or neutral. A balanced and accurate assessment of sentiment towards a topic can thus be determined.

25 Claims, 4 Drawing Sheets

OTHER PUBLICATIONS

Hatzivassiloglou, V. and McKeown, K. R. "Towards the automatic identification of adjective scales: Clustering adjectives according to meaning", *Proceedings of the 31st Annual Meeting of the Association for Computational Linguistics (ACL-EACL 93)*, pp. 172-182, Jun. 1993.

Dini, L. and Mazzini, G., "Opinion classification through information extraction", *CELI*, Turin, Italy.

Pang, B., Lee, L and Vaithyanathan, S. "Thumbs up? Sentiment Classification using Machine Learning Techniques", *Proceedings of the 2002 Conference on Empirical Methods in Natural Language Processing (EMNLP)*.

Tuney, P. D. "Thumbs up or thumbs down? Semantic orientation applied to unsupervised classification of reviews",*Proceedings 40th Annual Meeting of the Association for Computational Linguistics (ACL '02)*, pp. 417-424, Philadelphia, Pennsylvania.

* cited by examiner

EXTRACTING AND GROUPING OPINIONS FROM TEXT DOCUMENTS

FIELD OF THE INVENTION

The present invention relates to extracting and grouping opinions from text documents. More specifically, the invention relates to natural language processing of text documents for extracting and grouping phrases that express opinions concerning topics of interest.

BACKGROUND

Over recent years there has been rapid growth of on-line discussion groups and review sites on the World Wide Web (WWW). The content of "postings" to consumer-oriented forums largely relates to opinion expressed in the postings. Opinions authored by individuals, groups or organizations about various topics are a valuable resource for companies investigating market reaction to their own or a rival company's products.

In this context, there are two types of information that can be valuable as market information. Statistics on how much of the "talk" on the Web contains positive, negative or neutral sentiments towards a particular product, and the exact phrases used to express such sentiments. Consider a hypothetical example for "Car—Model DE". The relevant statistical information may consist of statements such as: 40% of opinions on this car are positive, 20% are negative, while remaining 40% are neutral. As an example, positive expressions may be "an economical car" and "smooth drive", negative expressions may be "poor performer on freeways" and "glitchy gear box", and neutral expressions "German car" and "compact car".

The task of manually tracking opinions about a particular topic from all Web documents is laborious. If one seeks opinions concerning a particular product, identifying the relevant documents in which they might occur can be difficult. The task becomes further labor-intensive if one is to extract opinions from the identified documents. Opinions may be scattered through a document, and may be expressed in subtle ways.

References Bo Pang et al and Turney et al each describe methods to determine the overall sentiment of a given document towards a given topic of interest using supervised classification methods. Relevant publication details are as follows. Pang, B. Lee, L. and Vaithyanathan, S. "Thumbs up? Sentiment Classificationusing Machine Learning Techniques", *Proceedings of the* 2002 *Conference on Empirical Methods in Natural Language Processing* (EMNLP), pages 79-86. Turney, P. D. "Thumbs up or thumbs down? Semantic orientation applied to unsupervised classification of reviews", *Proceedings* 40*th Annual Meeting of the Association for Computational Linguistics* (ACL '02), pages 417-424, Philadelphia, Pa.

References Pang et al and Turney et al both describe use of unigrams and bigrams extracted from documents as features for classification. Analysis of the sentiment at the document level for identifying opinions can, however, lead to loss of information. As an example, consider reviews of the movie Lancelot of the Lake from an online review site. There are favourable comments about the movie such as "a fascinating cinematic experience boldly made by a master filmmaker", "something rare in the modern cinema," and "a truly personal film". One may thus conclude that the review rates the movie as a "good" movie, though analyzing the document in this way may be misleading and may not necessarily reflect the diversity of views actually expressed therein.

To illustrate this point, the same document contains some very critical remarks about the actors such as "non-professional actors who recite the dialogue in emotionless flat voices", and some unfavourable remarks about the opening sequence such as "is a series of clumsy, disjointed fights amongst anonymous knights".

A need clearly exists for an improved manner of assessing sentiment expressed in textual matter in an automated manner.

SUMMARY

Techniques are described herein for extracting opinions about a topic from a text documents. Opinions are grouped depending on their semantic orientation. Phrases expressing sentiments or having certain connotations are referred to herein as "opinions". The topics to which opinions relate can range, for example, from commercial products to movies to political events. Text documents from which the opinions are extracted can be discussion forums, newsgroups, online news articles, and other accessible content.

Opinions are extracted based on rules defined on regular expressions for parts-of-speech tags. Three categories of opinions are preferred: opinions that talk about the topic in a positive sense, opinions that do so in negative sense, and opinions that are neutral in nature. Using this knowledge, the overall tone of a document can be rated with respect to a particular topic. Analyzing documents at a finer granularity level and extracting the opinions at the sentence or phrase level provides a substantial advantage in forming a balanced and accurate assessment of sentiment towards a topic.

Parts-of-speech (POS) tagging and regular expression (RE) rule engines extract opinion phrases. The extracted opinions are also grouped into three relevant classes based on their semantic orientation: positive, negative or neutral. Natural language databases and lexical references are used to group the opinions based on the meaning of the terms that constitute opinions.

DETAILED DESCRIPTION

A further contribution of the techniques described herein is to group the opinions based on their semantic orientations. A considerable amount of work exists for determining the polarity, that is, the "goodness" or "badness" of adjectives used in natural language.

Figure 1:
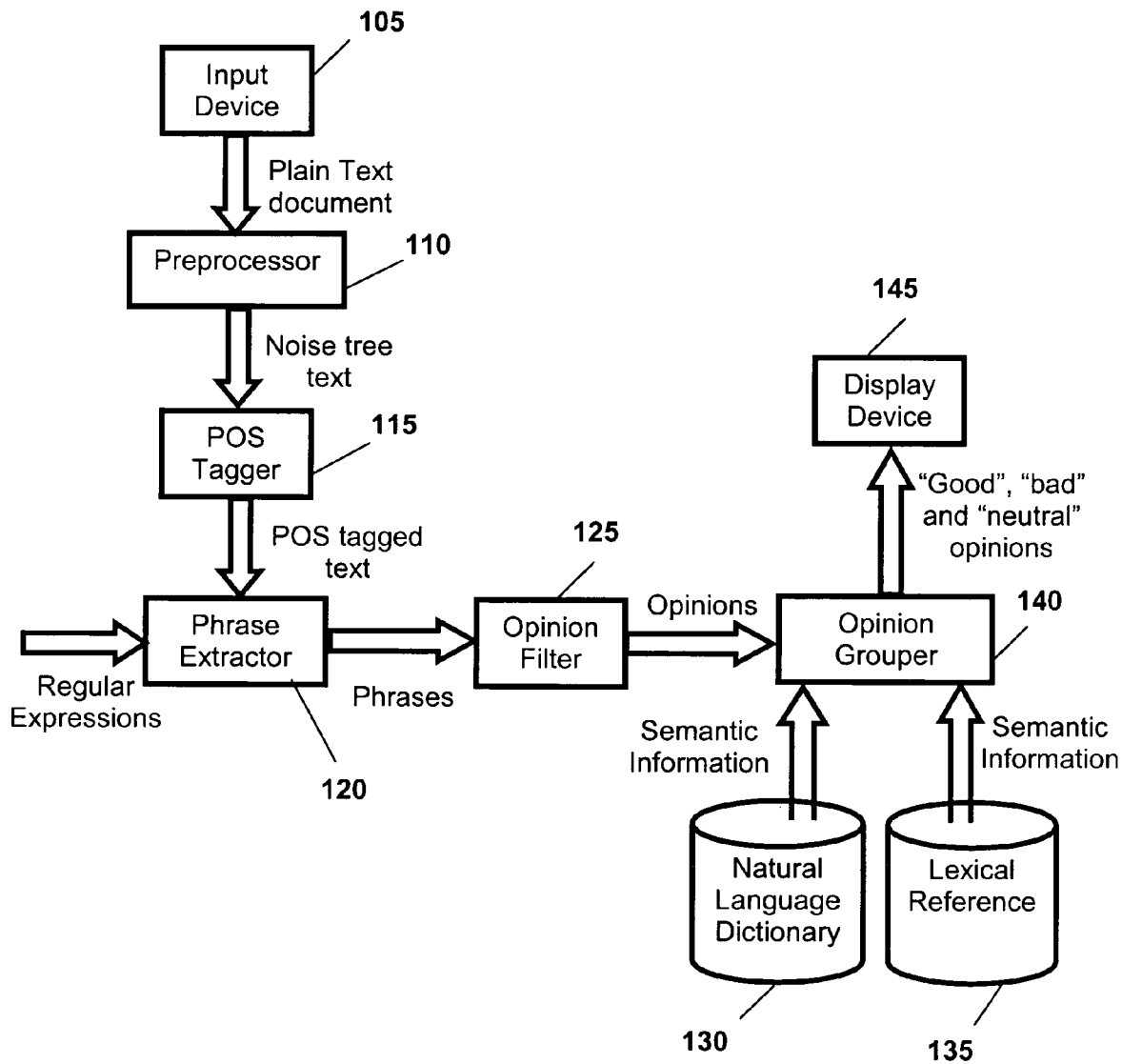
FIG. 1 is a schematic block diagram of a system for extracting opinion phases from a body of text documents.
Figure 2:
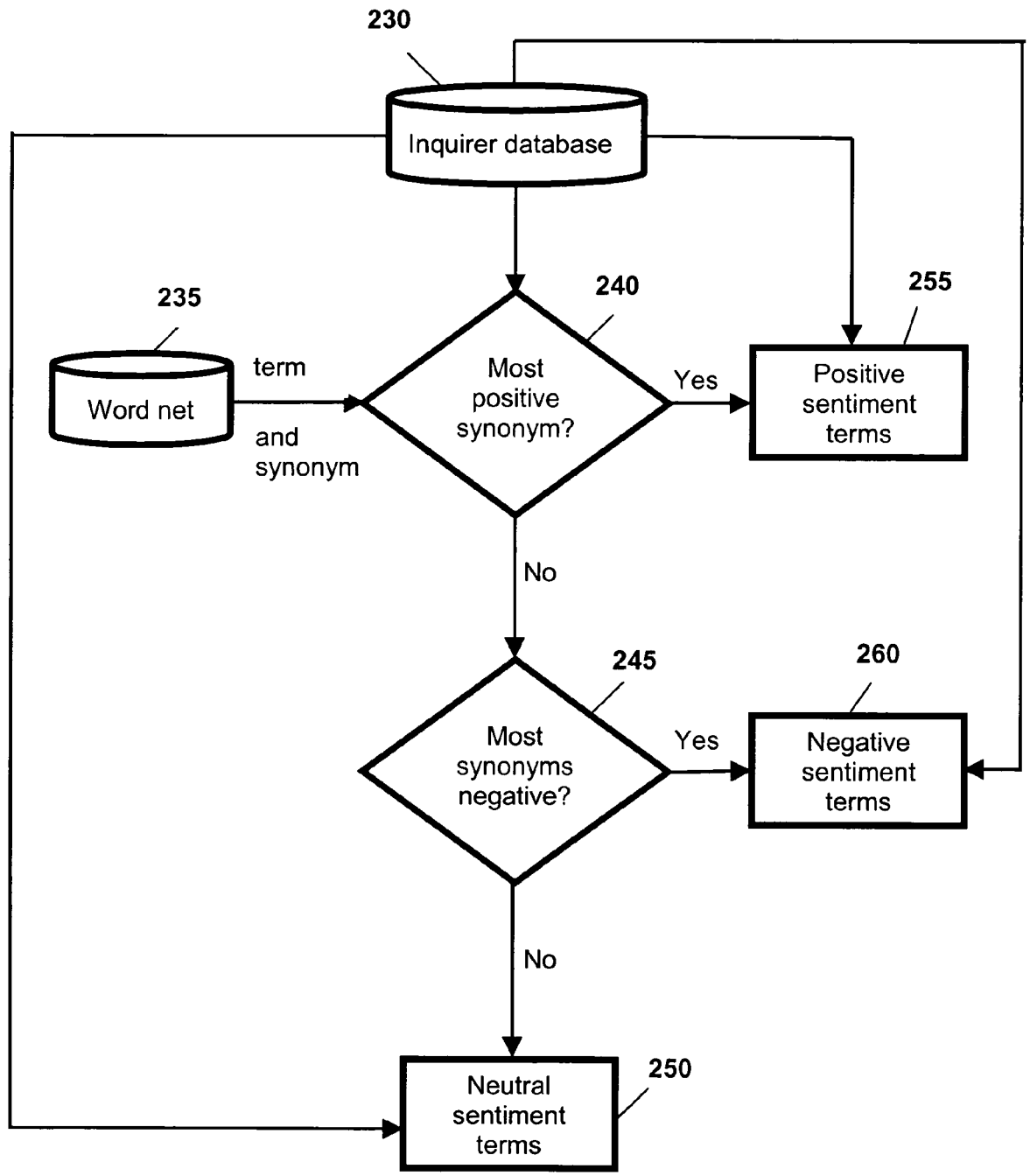
FIG. 2 is a schematic diagram representing creation of an enriched term dictionary from natural language database and lexical reference.

FIG. 1 provides a representation of a system for performing the techniques described herein. Components of this system and its operation are introduced by way of overview, and described in further details below. An Input Device 105, such as a keyboard, a disk drive, or internet link, provides a plain text document to a preprocessor 110 to provide "noise-free" text to a POS (Parts-of-speech) Tagger 115. Tagged text is presented to a Phrase Extractor 120 which, using prototype regular expression rules, constructs phrases for input to an Opinion Filter 125. The Opinion Grouper 140, which draws upon a Natural Language Dictionary 130 and a Lexical Reference 135 to categorize opinions favourable, infavourable and indifferent categorizes for displaying on a Display Device 145.

Part-of-Speech (POS) Tagging

Initially every document from a body or corpus of documents is passed through a pre-processor, which removes all HTML tags and all meta-tags. Some domain specific pre-processing can also be incorporated at this stage. Any other pre-processing that may be required can be performed.

Each of the words in the document is then tagged or with its associated parts-of-speech (POS). This process is called tagging, or parsing of the document. The output of this stage is an Extensible Markup Language (XML) document, with parts of speech tag as XML tag and the respective word as its value. Any similar non-XML format can also be adopted, if required. An example document and its tagged counterpart are shown in example in the next section.

Any POS tagger that can tag in Brown/Penn style can be used. Brown Penn style is a style of annotating text with the Part-Of-Speech tags of words. This is part of the Penn Treebank project from the LINC laboratory of Computer and Information Science. There are other tagging styles, such as *International Corpus of English Tagset, CLAWS*1*, CLAS*2*, . . . CLAWS*5 tagsets. Brown-Penn style is, however, the most commonly used tagset. Tagging can be used. JTALENT, produced by the International Business Machines (IBM) Corporation, is one suitable example of a tagger that can also be used. Other popular taggers can also be used if required.

Opinion Extraction

Opinion extraction is based on the observation that POS tag sequences of opinions follow a regular pattern. Certain tag sequence patterns occur regularly in the POS tag sequences of opinions. A set of regular expression rules of POS tags that covers the frequently occurring patterns is constructed. Regular expression is any description of a pattern composed from combinations of symbols (POS tags in this case) and the three operators are Concatenation, Or and Closure.

These regular expressions are matched against the POS tag sequences of the words in the documents. For every maximal match of the POS tag sequence, the corresponding words are extracted from the original document and reported as opinions. The input to this stage is the POS tagged document and the regular expression (RE) rules that depicts the possible opinions. The system then matches the RE rules with POS tag sequence patterns in the input text document and outputs the opinions. The following example illustrates the extraction of opinions from text based on regular expression rules.

Table 1 below describes some of the POS tags used in the example. Table 2 below presents an example part of text which is tagged using some of these stages, according to the Brown Penn style.

TABLE 1

| Tag | Meaning of the tag |
| --- | --- |
| CC | Coordinating conjunction |
| CD | Cardinal number |
| DT | Determiner |
| EX | Existential there |
| FW | Foreign word |
| IN | Preposition or subordinating conjunction |
| JJ | Adjective |

TABLE 1-continued

| Tag | Meaning of the tag |
| --- | --- |
| JJR | Adjective, comparative |
| JJS | Adjective, superlative |
| LS | List item marker |
| MD | Modal |
| NN | Noun, singular or mass |
| NNS | Noun, plural |
| NNP | Proper noun, singular |
| NNPS | Proper noun, plural |
| PDT | Predeterminer |
| POS | Possessive ending |
| PRP | Personal pronoun |
| PRP$ | Possessive pronoun |
| RB | Adverb |
| RBR | Adverb, comparative |
| RBS | Adverb, superlative |
| RP | Particle |
| SYM | Symbol |
| TO | To |
| UH | Interjection |
| VB | Verb, base form |
| VBD | Verb, past tense |
| VBG | Verb, gerund or present participle |

TABLE 2

A regular expression rule:- (is | are) * (<JJ>|<JJR>|<JJS>) + (<NN>|<NNS>) + (<IN>|<TO>) * (<NN>|<NNS>) *
Original Text:- Rescuing it from total destruction are good performances by Bridges who is convincing in his pain and obsessions.
POS tags of text:-<VBG>Rescuing</> <PP>it </> <IN>from </> <JJ>total </> <NN>destruction </> are <JJ>good </> <NNS>performances </> <IN>by </> <NNS>Bridges </> <WP>who </> is <JJ>convincing </> <IN>in </> <PP$>his </> <NN>pain </> <CC>and </> <NNS>obsessions </>.
Matched pattern: - are <JJ>good </> <NNS>performances </> <IN>by </> <NNS>Bridges </>
Extracted opinion:- are good performances by Bridges.

Natural Language Dictionary and Lexical Reference

As described herein, a natural language dictionary, and a lexical reference are used to determine the meaning and sentiment or connotation of words used to in express text opinions.

The General Inquirer database is an example of a suitable natural language dictionary that may be used. Details of the Inquirer database can be accessed from its homepage at http://www.wjh.harvard.edu/~inquirer/. The Inquirer database contains more than 4,000 unique words, mostly adjectives, and for each word the database defines approximately 200 Boolean attributes. Some examples of attributes are: is Positive, is Negative, is Hostile, isRelatedToPleasure, and isRelatedToPain. Many other attributes can be used, as required. This word-attribute matrix is sparse and only a few attributes for each word have the value true. In the first step of clustering, these attributes are used to decide whether an opinion is positive or negative. These attributes can determine whether the word is used predominantly in a positive sense, or in a negative sense.

The WordNet database is an example of an online lexical database. The WordNet database is an online lexical reference system whose design is inspired by current psycholinguistic theories of human lexical memory. Almost 20,000 English language nouns, verbs and adjectives are organized into synonym sets, each representing one underlying concept.

The Inquirer and WordNet databases are presented as example databases, though other suitable databases can also be used as required. Further, a combined database containing relevant information required to perform the techniques described herein may be preferred.

Grouping Opinions

After extracting the opinions, the next step is to group the opinions into different clusters depending on their nature. The opinions are clustered into three clusters, namely positive, negative and neutral. A natural language dictionary and an online lexical reference, as described above, is used to achieve this end.

As an example, able has positive connotations whereas deformed has negative connotations. The described techniques determine whether words of the opinion are used in a positive or negative sense from the natural language dictionary. If the majority of the words present in the opinion are positive, then the described technique classifies the opinion as a positive opinion. If the majority of attributed meanings have a negative connotation, then the opinion is classified as a negative opinion. Otherwise, the opinion is deemed neutral. While deciding the sentiment of the opinion, the technique also takes into account other relevant factors. As an example, if the word "not" is present in the opinion, then clustering changes from positive to negative and vice versa.

Though natural language databases, such as the above-mentioned Inquirer database, store a lot of information about the nature of the words in the database, such databases may not contain all synonyms for frequently used words. This is especially the case for idiomatic expressions, or local usages in current vogue. As a result, the number of opinions that can be classified as positive or negative can be relatively low. To enrich the available collection of positive and negative words, a lexical reference is desirably consulted. Again, a suitable example is the WordNet database.

In the techniques described herein for opinion clustering, if a word is not found in the natural language database, all the synonyms of that word are extracted from the lexical reference. If most of the synonyms are positive (or negative) according to the natural language dictionary, then the original word is also marked as positive (or negative) and accordingly the opinion is tagged.

If none of these courses of action determine the nature of a word, then the canonical form of the word is sought through morphological stemming in consultation with the natural language dictionary. The canonical form of the word is sought in the natural language database to see if the database contains any information about the root form of that word.

Finally, opinions extracted from the document collection are marked in the original text with different tags depending on their classification.

Displaying Opinions and the Groups

Figure 3:
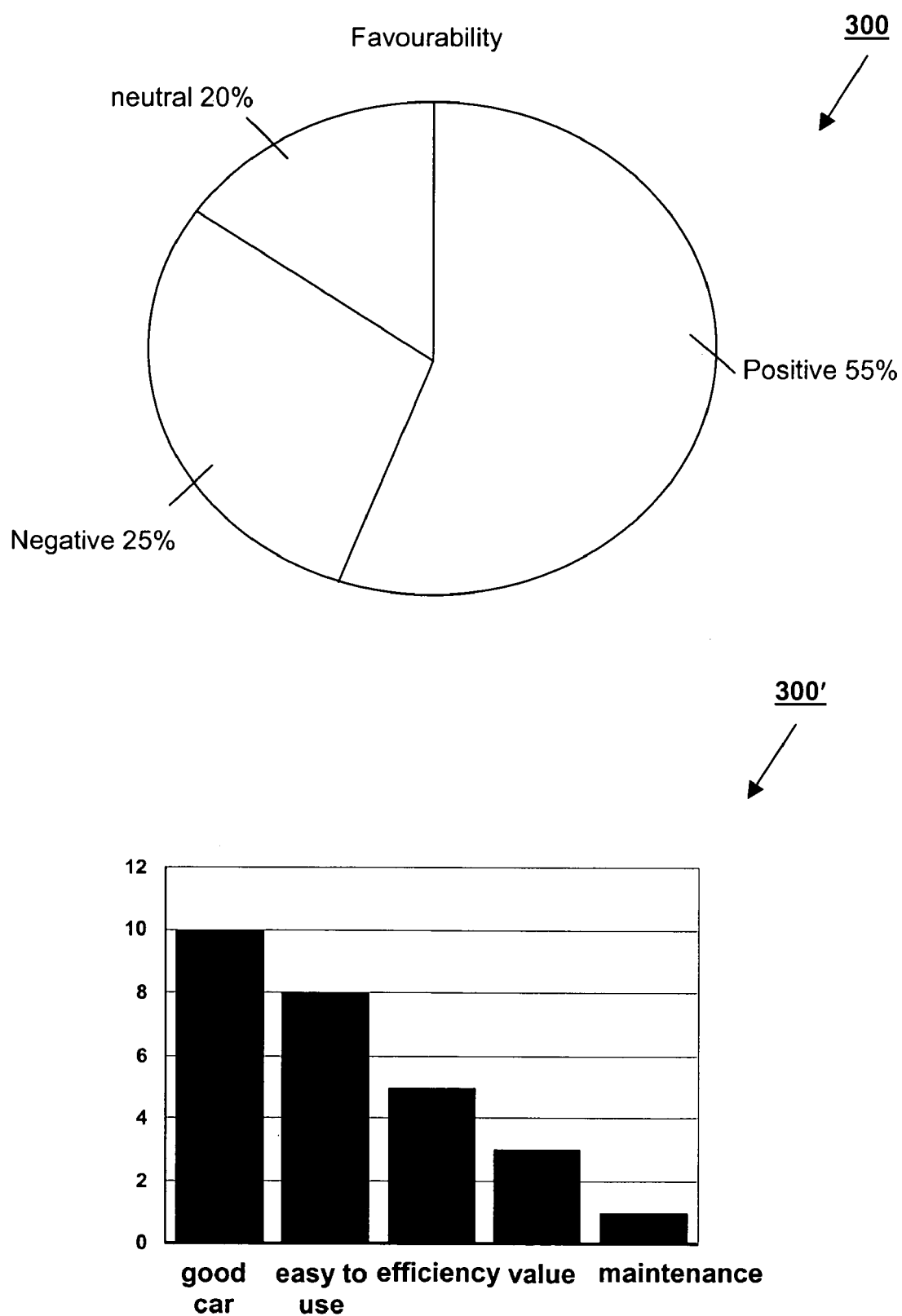
FIG. 3 is a pie chart and a bar chart form of the results of classified opinions relating to an example of the text processing techniques described techniques.

FIG. 3 presents corresponding information in pie-chart form 300 and bar-chart form 300'. The pie chart 300 summarizes the overall distribution of positive, negative and neutral opinion for a given topic. The bar chart 300' is useful for ranking and viewing the important opinion phrases. Any other suitable form of graphical or tabular representation can also be adopted as required.

Computer Hardware and Software

Figure 4:
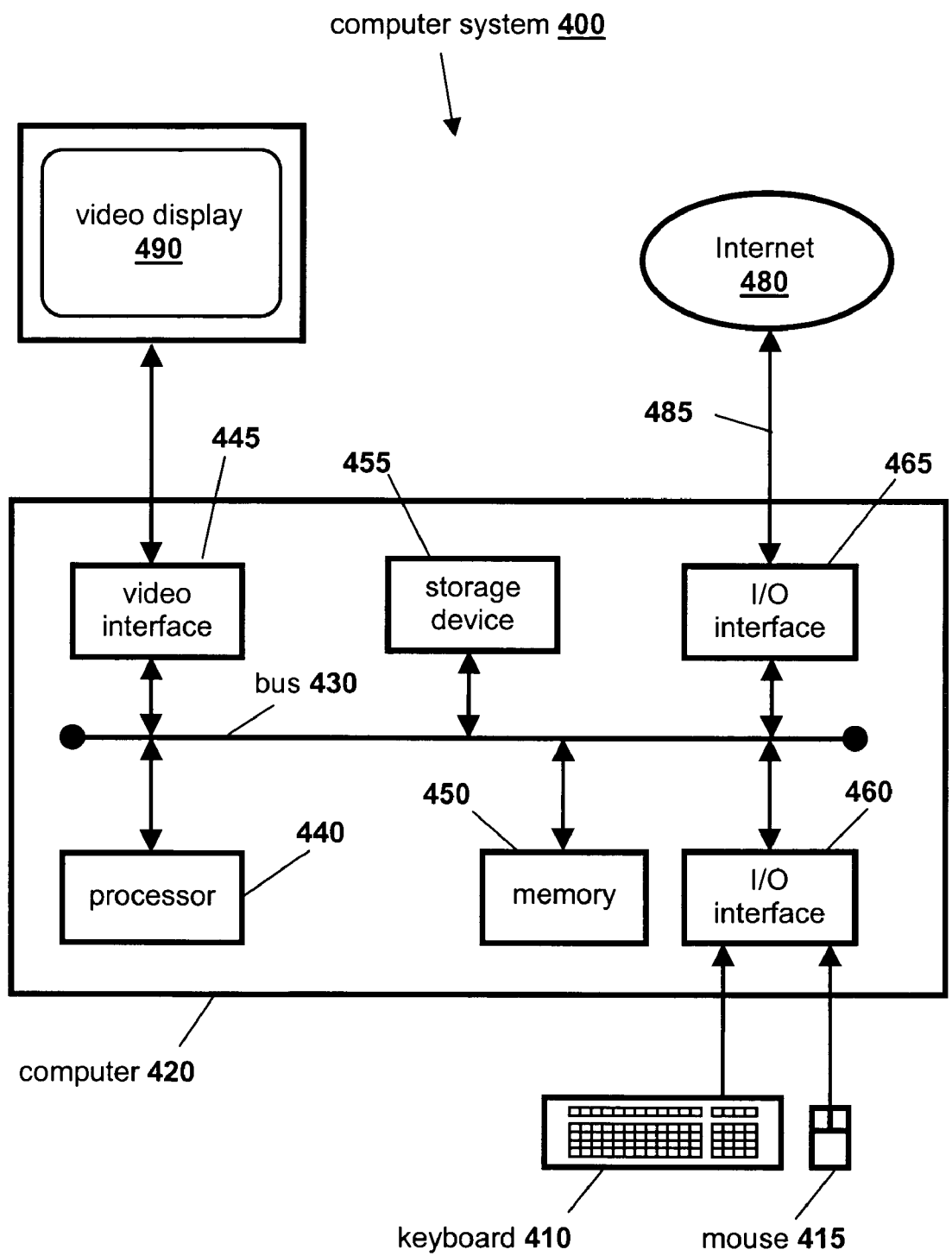
FIG. 4 is a schematic representation of a computer system suitable for use in text processing as described herein.

FIG. 4 is a schematic representation of a computer system 400 that can be used for text processing as described herein. Computer software executes under a suitable operating system installed on the computer system 400 to assist in performing the described techniques. This computer software is programmed using any suitable computer programming language, and may be thought of as comprising various software code means for achieving particular steps.

The components of the computer system 400 include a computer 420, a keyboard 410 and mouse 415, and a video display 490. The computer 420 includes a processor 440, a memory 450, input/output (I/O) interfaces 460, 465, a video interface 445, and a storage device 455.

The processor 440 is a central processing unit (CPU) that executes the operating system and the computer software executing under the operating system. The memory 450 includes random access memory (RAM) and read-only memory (ROM), and is used under direction of the processor 440.

The video interface 445 is connected to video display 490 and provides video signals for display on the video display 490. User input to operate the computer 420 is provided from the keyboard 410 and mouse 415. The storage device 455 can include a disk drive or any other suitable storage medium.

Each of the components of the computer 420 is connected to an internal bus 430 that includes data, address, and control buses, to allow components of the computer 420 to communicate with each other via the bus 430.

The computer system 400 can be connected to one or more other similar computers via a input/output (I/O) interface 465 using a communication channel 485 to a network, represented as the Internet 480.

The computer software may be recorded on a portable storage medium, in which case, the computer software program is accessed by the computer system 400 from the storage device 455. Alternatively, the computer software can be accessed directly from the Internet 480 by the computer 420. In either case, a user can interact with the computer system 400 using the keyboard 410 and mouse 415 to operate the programmed computer software executing on the computer 420.

Other configurations or types of computer systems can be equally well used to implement the described techniques. The computer system 400 described above is described only as an example of a particular type of system suitable for implementing the described techniques.

Applications

The techniques described herein have many applications. As an example, companies may wish to determine what consumers are "saying" about their products, or about the rival company's products. Manual inspection of opinions from various sources is extremely tedious and impractical. If, however, opinions are summarized as a pie-chart or histogram that shows statistics of positive and negative opinions, and if typical expressions used in the opinions can be determined, such information can be of use in making informed decisions about business strategy. This kind of use as an "opinion miner" can also be useful in a business intelligence application, or as a recommendation system. Moreover, survey responses given in natural language format can be processed using this technique.

CONCLUSION

Various alterations and modifications can be made to the techniques and arrangements described herein, as would be apparent to one skilled in the relevant art.

We claim:

1. A computer-implemented method of analyzing opinions in a text document, said method comprising:

using a computer, establishing a predetermined set of regular expressions, each regular expression of said predetermined set of regular expressions corresponding to a specific parts-of-speech (POS) tag sequence;

using said computer, inputting and parsing said text document to provide a plurality of POS tag sequences;

using said computer, matching said predetermined set of regular expressions to said plurality of POS tag sequences from said text document to provide one or more extracted opinions;

using said computer, lexically analyzing each word of said one or more extracted opinions to group said one or more extracted opinions into clusters of extracted opinions; and any of: using said computer, marking said one or more extracted opinions in said text document with classification tags, wherein said classification tags correspond to said clusters of extracted opinions; and using said computer, graphically displaying said clusters of extracted opinions, wherein said graphically displaying comprises any of: displaying relative proportions of said extracted opinions in said clusters of extracted opinions; and displaying said clusters of extracted opinions using a chart.

2. The method of claim 1, wherein said clusters of extracted opinions comprise any of positive and negative clusters of extracted opinions.

3. The method of claim 1, wherein said clusters of extracted opinions comprise any of positive, negative, and neutral clusters of extracted opinions.

4. The method of claim 1, further comprising organizing said clusters of extracted opinions into groups, wherein said one or more extracted opinions within each of said groups comprises a similar topic.

5. The method of claim 1, wherein said lexically analyzing each word of said one or more extracted opinions comprises accessing a natural language database to group said one or more extracted opinions into said clusters of extracted opinions.

6. The method of claim 1, wherein said lexically analyzing each word of said one or more extracted opinions comprises identifying any of a synonym and an antonym for said each word of said one or more extracted opinions.

7. The method of claim 1, wherein said lexically analyzing each word of said one or more extracted opinions comprises determining a morphological stem for said each word of said one or more extracted opinions.

8. The method of claim 1, further comprising marking said one or more extracted opinions in said text document with classification tags, wherein said classification tags correspond to said clusters of extracted opinions.

9. The method of claim 1, wherein said graphically displaying comprises displaying said clusters of extracted opinions using any of a pie-chart and a bar-chart.

10. A program storage device readable by machine, tangibly embodying a program of instructions executable by said machine to perform a method of analyzing opinions in a text document, said method comprising:

establishing a predetermined set of regular expressions, each regular expression of said set of regular expressions corresponding to a specific parts-of-speech (POS) tag sequence;

inputting and parsing said text document to provide a plurality of POS tag sequences;

matching said predetermined set of regular expressions to said plurality of POS tag sequences from said text document to provide one or more extracted opinions;

lexically analyzing each word of said one or more extracted opinions to group said one or more extracted opinions into clusters of extracted opinions; and any of: marking said one or more extracted opinions in said text document with classification tags, wherein said classification tags correspond to said clusters of extracted opinions; and graphically displaying said clusters of extracted opinions, wherein said graphically displaying comprises any of: displaying relative proportions of said extracted opinions in said clusters of extracted opinions; and displaying said clusters of extracted opinions using a chart.

11. The program storage device of claim 10, wherein said clusters of extracted opinions comprise any of positive and negative clusters of extracted opinions.

12. The program storage device of claim 10, wherein said clusters of extracted opinions comprise any of positive, negative, and neutral clusters of extracted opinions.

13. The program storage device of claim 10, further comprising organizing said clusters of extracted opinions into groups, wherein said one or more extracted opinions within each of said groups comprises a similar topic.

14. The program storage device of claim 10, wherein said lexically analyzing each word of said one or more extracted opinions comprises accessing a natural language database to group said one or more extracted opinions into said clusters of extracted opinions.

15. The program storage device of claim 10, wherein said lexically analyzing each word of said one or more extracted opinions comprises identifying any of a synonym and an antonym for said each word of said one or more extracted opinions.

16. The program storage device of claim 10, wherein said lexically analyzing each word of said one or more extracted opinions comprises determining a morphological stem for said each word of said one or more extracted opinions.

17. The program storage device claim 10, further comprising marking said one or more extracted opinions in said text document with classification tags, wherein said classification tags correspond to said clusters of extracted opinions.

18. The program storage device of claim 10, wherein said graphically displaying comprises displaying said clusters of extracted opinions using any of a pie-chart and a bar-chart.

19. A computer-implemented method of analyzing opinions in a text document, said method comprising:

using a computer, establishing a predetermined set of regular expressions, each regular expression of said set of regular expressions corresponding to a specific parts-of-speech (POS) tag sequence;

using said computer, inputting and parsing said text document to provide a plurality of POS tag sequences;

using said computer, matching said predetermined set of regular expressions to said plurality of POS tag sequences from said text document to provide one or more extracted opinions;

using said computer, lexically analyzing each word of said one or more extracted opinions to group said one or more extracted opinions into clusters of extracted opinions; and any of:

using said computer, marking said one or more extracted opinions in said text document with classification tags, wherein said classification tags correspond to said clusters of extracted opinions; and using said computer, graphically displaying said clusters of extracted opinions, wherein said graphically displaying comprises any of:

displaying relative proportions of said extracted opinions in said clusters of extracted opinions; and displaying said clusters of extracted opinions using any of a pie-chart and a bar-chart.

20. The method of claim 19, wherein said clusters of extracted opinions comprise any of positive and negative clusters of extracted opinions.

21. The method of claim 19, wherein said clusters of extracted opinions comprise any of positive, negative, and neutral clusters of extracted opinions.

22. The method of claim 19, further comprising organizing said clusters of extracted opinions into groups, wherein said one or more extracted opinions within each of said groups comprises a similar topic.

23. The method of claim 19, wherein said lexically analyzing each word of said one or more extracted opinions comprises accessing a natural language database to group said one or more extracted opinions into said clusters of extracted opinions.

24. The method of claim 19, wherein said lexically analyzing each word of said one or more extracted opinions comprises identifying any of a synonym and an antonym for said each word of said one or more extracted opinions.

25. The method of claim 19, wherein said lexically analyzing each word of said one or more extracted opinions comprises determining a morphological stem for said each word of said one or more extracted opinions.

* * * * *